I. J. JOHNSON & H. McCLELLAND.
ROTARY PUMP.
APPLICATION FILED OCT. 6, 1913.

1,143,200.

Patented June 15, 1915.

WITNESSES:
Charles Pickles
F. E. Maynard

INVENTORS
Isral J. Johnson
Harry McClelland
BY G. H. Strong
ATTORNEY

UNITED STATES PATENT OFFICE.

ISRAEL J. JOHNSON AND HARRY McCLELLAND, OF REDDING, CALIFORNIA.

ROTARY PUMP.

1,143,200.           Specification of Letters Patent.       Patented June 15, 1915.

Application filed October 6, 1913. Serial No. 793,649.

*To all whom it may concern:*

Be it known that we, ISRAEL J. JOHNSON and HARRY MCCLELLAND, citizens of the United States, residing at Redding, in the county of Shasta and State of California, have invented new and useful Improvements in Rotary Pumps, of which the following is a specification.

This invention relates to pumps, and particularly to rotary pumps.

The object of the present invention is to provide an improvement in pumps in which there is a rotary impeller coöperating with eccentrically mounted independently oscillating impeller blades in combination with a casing concentric with the center of the impeller blades, and within which the rotor is eccentric; and a further object of the invention is to provide means for reducing the friction of the parts.

Another object of the invention is to provide a safety trap or yieldable wall section for receiving large solid pieces which may be drawn into the pump, and thereby save the parts from breakage or other injury.

The invention further consists of the parts and the construction and combination of parts as hereinafter more fully described and claimed, having reference to the accompanying drawings, in which,—

Figure 1:
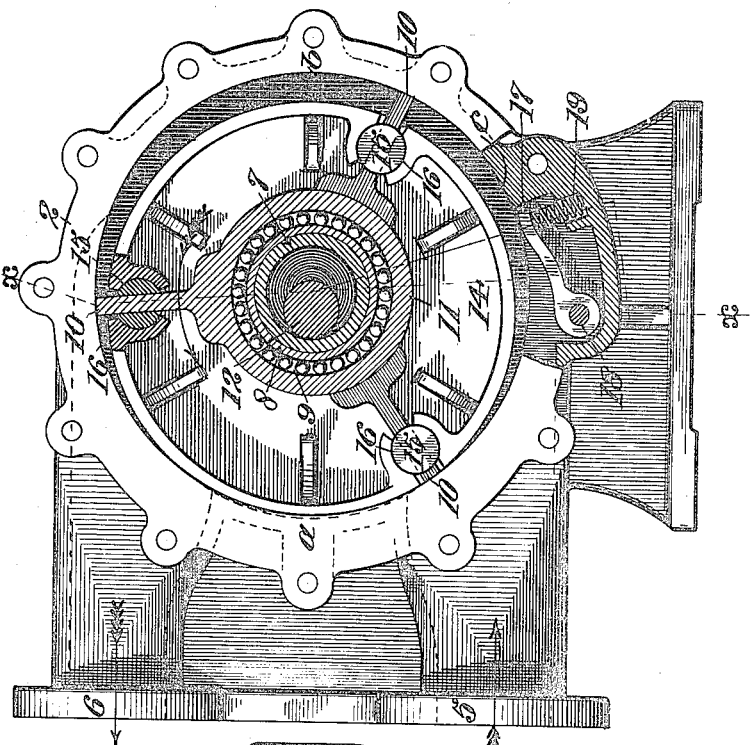
Figure 2:
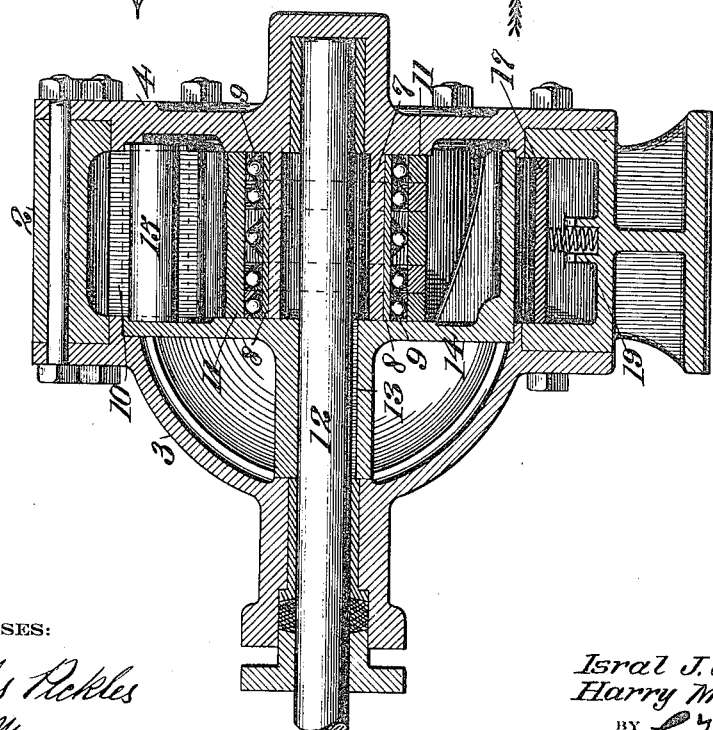

Figure 1 is a side elevation of the pump with one of the heads removed and showing an impeller blade and a portion of the rotor in section. Fig. 2 is a transverse section on the line *x—x* of Fig. 1.

In the present embodiment of our invention 2 represents a suitable pump cylinder having removable heads 3 and 4, upon which is formed a cylindrical chamber of suitable proportions at one side of which is formed an inlet port 5, and at the opposite side of which is an outlet port 6. The head 4 of the pump is provided with a tubular concentric hub 7, surrounded by a bushing 8, upon which is mounted a ball-bearing structure 9, and upon the ball-bearings are mounted several radial impeller blades 10, the hubs 11 of which are intermeshed hinge fashion to rock independently about the bushing 8; the extremities of the impellers 9 having a snug running fit with the annular inner surface of the cylinder 2.

Mounted eccentrically with relation to the cylinder 2 and journaled in the heads 3—4 of the pump, is a drive shaft 12, upon which is keyed at 13 a rotor or driver 14, of such diameter as to run very close to the inner wall of the pump cylinder 2 at one point, as *a* in Fig. 1, leaving at the opposite side, at *b*, a crescent shaped chamber or cavity, across which and beyond the periphery of the rotor 14 the ends of the impeller blades 10 will successively sweep during rotation; the blades rocking with suitable roller journals 15 in apertures 16, provided at suitable intervals circumferentially about the rotor 14. Because of the eccentricity of the axes of the shaft 12 and the journal 7 of the impeller hubs 11, there will be a relative sliding and oscillating movement of the impeller blades with relation to the rotor 14, the blades also having a relative independent motion to each other; this being provided for by the intermeshing of their respective hubs hinge fashion and loose mounting on the journals 7—8.

In operation, when power is applied to the driving shaft 12 from any suitable source, the rotor 14 will revolve on its axis eccentrically within the larger chamber of the cylinder 2, so that the impeller blades 12 will be swept around successively through the crescent chamber *b*, and have a tendency to create a vacuum in the suction side 5 of the chamber which will draw the liquid being impelled into the chamber 6 behind the leading blade 10, the induced charge being cut off by the next following blade as this passes over the solid shoulder *c* at the inner end of the suction port.

For the purpose of protecting the pump from injury by solid substances, which may be drawn in, we have introduced a trap structure consisting of a gate 17, pivotally mounted on a pin 18 and resiliently supported at its inner end by a spring 19, which draws the gate or wing 17 upwardly. Any solid substance entering the pump and which may happen to jam between the end of the blade 10 and the inclined upper surface of the gate 17 will force the latter downwardly, the yielding of which upon the spring 19 will allow the blade 10 to ride off the obstacle, when this will then be drawn in behind the blade, as the spring 19 automatically rises as the obstacle is cleared between the end of the blade and the top surface of the wing. This is an important feature of the invention in that it will greatly reduce the wear of the wings and also at the portion *c* of the pump surface where the inlet port terminates in conjunction with the pump cylinder surface. By eliminating this wear we save the renewal of parts and eliminate the loss of time consumed in making renewals.

In its present design we have shown the head 3 as hemispherical, so that its journal part supporting the shaft 12 is spaced sufficiently to one side of the inner end of the fixed sleeve 7, and the rotor 14 has its hub portion keyed on the shaft 12 in the space between the journal part of the head 3 and the inner end of the sleeve 7, the rotor having an overhanging flange portion 14' in which the rolling blade journals 15 are mounted. By this means when it is desired to renew the journals 15, it is only necessary to remove the outer head 4, so that access can be had to the edge of the overhanging flange 14' on the rotor and the adjacent ends of the ports 15.

Having thus described our invention what we claim and desire to secure by Letters Patent, is:

A rotary pump including a pump cylinder, a removable head therefor having a tubular inwardly projecting hub, a solid shaft extending eccentrically through the tubular hub and supported in the removable head, a rotor fixed to the shaft and having an annular flange, said flange having roller bearing chambers closed at their inner ends only, a roller bearing in each chamber adapted to be dislodged through the outer end only of the chamber, the removable head abutting the annular flange of the rotor and normally closing the opened ends of the roller bearing chambers to retain the roller bearings from dislodgment, impeller blades supported on the tubular hub of the head for rotation and projecting through the roller bearings, induction and eduction ports in the pump cylinder, and means for securing the removable head and rotor in place.

In testimony whereof we have hereunto set our hands in the presence of two subscribing witnesses.

ISRAEL J. JOHNSON.
HARRY McCLELLAND.

Witnesses:
R. F. GILES,
JAS. G. ESTEP.

Copies of this patent may be obtained for five cents each, by addressing the "Commissioner of Patents, Washington, D. C."